United States Patent
Chu

(10) Patent No.: US 9,400,746 B2
(45) Date of Patent: Jul. 26, 2016

(54) DATA STORAGE DEVICE AND FLASH MEMORY CONTROL METHOD

(71) Applicant: Silicon Motion, Inc., Jhubei, Hsinchu County (TW)

(72) Inventor: Po-Chia Chu, Kaohsiung (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 352 days.

(21) Appl. No.: 14/195,118

(22) Filed: Mar. 3, 2014

(65) Prior Publication Data
US 2015/0032944 A1 Jan. 29, 2015

(30) Foreign Application Priority Data
Jul. 25, 2013 (TW) .............................. 102126606 A

(51) Int. Cl.
*G06F 12/00* (2006.01)
*G06F 12/02* (2006.01)

(52) U.S. Cl.
CPC .... *G06F 12/0246* (2013.01); *G06F 2212/7211* (2013.01)

(58) Field of Classification Search
None
See application file for complete search history.

(56) References Cited

U.S. PATENT DOCUMENTS

2008/0279005 A1* 11/2008 France .............. G06F 12/0246
365/185.11

* cited by examiner

*Primary Examiner* — Reginald Bragdon
*Assistant Examiner* — Hannah A Faye-Joyner
(74) *Attorney, Agent, or Firm* — McClure, Qualey & Rodack, LLP

(57) ABSTRACT

A FLASH memory control technique with wear leveling between the different blocks of the FLASH memory. By a controller managing the blocks of a FLASH memory within a data storage device, some of the blocks are pushed into a spare queue waiting to be allocated as data blocks or system blocks and some blocks are pushed into a jail queue to be inaccessible. When the jail queue is full and any block within the spare queue has an erase count greater than any block within the jail queue, for wear leveling between the different blocks within the FLASH memory, the controller releases a first block selected from the jail queue and pushes a second block selected from the spare queue into the jail queue.

18 Claims, 2 Drawing Sheets

DATA STORAGE DEVICE AND FLASH MEMORY CONTROL METHOD

CROSS REFERENCE TO RELATED APPLICATIONS

This Application claims priority of Taiwan Patent Application No. 102126606, filed on Jul. 25, 2013, the entirety of which is incorporated by reference herein.

BACKGROUND OF THE INVENTION

1. Field of the Invention

The present invention relates to data storage devices, and in particular to FLASH memory control methods.

2. Description of the Related Art

Flash memory is a general non-volatile storage device that is electrically erased and programmed. A NAND Flash, for example, is primarily used in memory cards, USB flash devices, solid-state drives, and so on. In another application with a multi-chip package technique, a NAND FLASH chip and a controller chip are combined in one package as an embedded MultiMediaCard (eMMC).

Generally, the physical storage space of a FLASH memory (e.g. a NAND FLASH) comprises a plurality of blocks. To release a block as a spare block, the entire block has to be erased. However, a block is not always erasable. A block may be damaged if an erase operation is performed too many times. To prolong the lifetime of a FLASH memory, a wear leveling between the different blocks is an important issue in the FLASH memory, to narrow the gap between the erase counts of the different blocks.

BRIEF SUMMARY OF THE INVENTION

Data storage devices and FLASH memory control methods are disclosed.

A data storage device in accordance with an exemplary embodiment of the invention comprises a controller and a FLASH memory. The physical storage space provided by the FLASH memory comprises a plurality of blocks. The controller for the management of the plurality of blocks pushes some of the blocks into a spare queue, waiting to be allocated as system blocks or data blocks. Furthermore, the controller pushes some of the blocks into a jail queue to freeze these blocks. The controller further monitors the erase counts of the blocks within the spare queue and the jail queue. When the jail queue is full and any block within the spare queue has an erase count greater than any block within the jail queue, for wear leveling between the different blocks of the FLASH memory, the controller releases a first block selected from the jail queue and pushes a second block selected from the spare queue into the jail queue. The first block may be the block having the lowest or having the second-lowest erase count within the jail queue, or, the first block may be selected from the blocks having the lower erase counts within the jail queue. The second block may be the block having the highest or having the second-highest erase count within the spare queue, or, the second block may be selected from the blocks having the higher erase counts within the spare queue.

In another exemplary embodiment of the invention, a FLASH memory control method is disclosed, which comprises the following steps: managing a plurality of blocks of a FLASH memory to push some of the plurality of blocks into a spare queue waiting to be allocated as system blocks or data blocks and push some of the plurality of blocks into a jail queue to freeze these blocks; monitoring the erase counts of the blocks within the spare queue and the jail queue; and, for wear leveling between the different blocks of the FLASH memory, releasing a first block selected from the jail queue and pushing a second block selected from the spare queue into the jail queue when the jail queue is full and any block within the spare queue has an erase count greater than any block within the jail queue. The first block may be the block having the lowest or having the second-lowest erase count within the jail queue, or, the first block may be selected from the blocks having the lower erase counts within the jail queue. The second block may be the block having the highest or having the second-highest erase count within the spare queue, or, the second block may be selected from the blocks having the higher erase counts within the spare queue.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
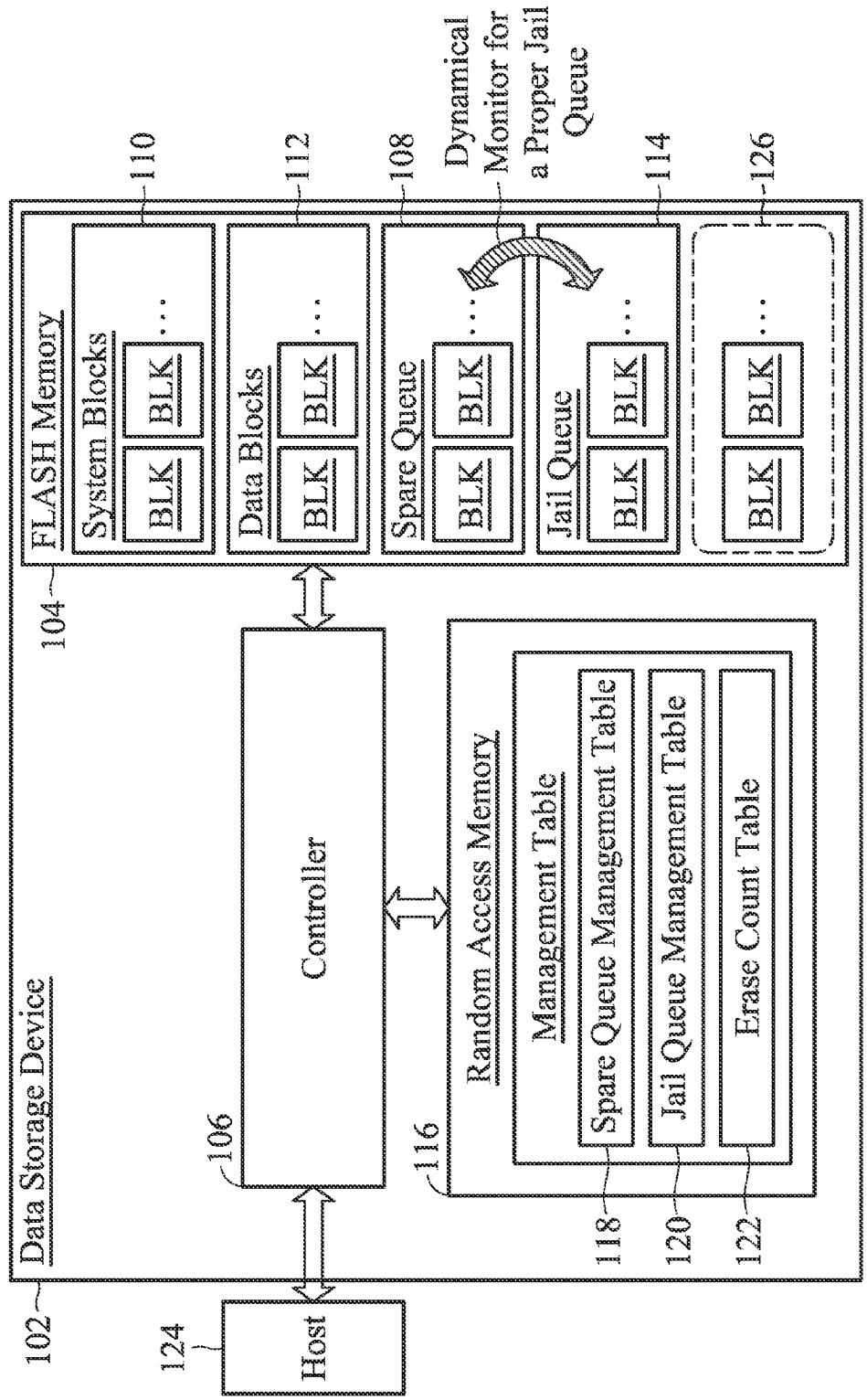
FIG. 1 is a block diagram depicting a data storage device in accordance with an exemplary embodiment of the invention.

FIG. 1 is a block diagram depicting a data storage device 102 in accordance with an exemplary embodiment of the invention. The data storage device 102 comprises a FLASH memory 104 and a controller 106. The FLASH memory 104 provides a physical storage space which includes a plurality of blocks BLKs. The controller 106 is provided for the management of the plurality of blocks BLKs. Under the control of the controller 106, some of the blocks BLKs are pushed into a spare queue 108 waiting to be allocated as systems blocks 110 for storage of system information or data blocks 112 for storage of user data. Furthermore, the controller 106 further pushes some of the blocks into a jail queue 114 to freeze these blocks. The controller 106 specially monitors the erase counts of the blocks within the jail queue 114 and the spare queue 108. When the jail queue 114 is full and any block within the spare queue 108 has an erase count greater than that of any block within the jail queue 114, the controller 106 releases a block from the jail queue 114 (e.g., the block has the lowest erase count within the jail queue 114) and pushes a block into the jail queue 114 (e.g., the block has the highest erase count within the spare queue 108). In this manner, the blocks having erase counts approaching the critical thresholds are correctly imprisoned in the jail queue 114, protected from being incorrectly pushed into the spare queue 108 for erase and allocation operations. The wear-leveling between the different blocks of the FLASH memory 104 is further improved and the lifespan of the FLASH memory 104 is thereby prolonged.

In other exemplary embodiments, instead of the block having the lowest erase count within the jail queue 114, other blocks are released from the jail queue 114. For example, the block having the second-lowest erase count within the jail queue 114 or the block selected from the blocks having the lower erase counts within the jail queue 114 may be selected and released from the jail queue 114.

Furthermore, in another exemplary embodiment, the block selected from the spare queue 108 to be pushed into the jail queue 114 is not limited to the block having the highest erase count within the spare queue 108. For example, the block having the second-highest erase count within the spare queue 108 may be selected to be pushed into the jail queue 114, or, the block selected from the blocks having the higher erase counts within the spare queue 108 may be the one pushed into the jail queue 114.

Referring to the exemplary embodiment of FIG. 1, the data storage device 102 further provides a random access memory 116 for dynamically recording the erase counts of the blocks within the spare queue 108 and the jail queue 114 by management tables. By the controller 106, the table is refreshed in real time. In the random access memory 116, the tables refreshed in real time may include a spare queue management table 118, a jail queue management table 120 and an erase count table 122. The blocks within the spare queue 108 are listed in the spare queue management table 118. The blocks within the jail queue 114 are listed in the jail queue management table 120. The erase counts of the different blocks of the FLASH memory 104 are listed in the erase count table 122. Based on the contents within the spare queue management table 118, the jail queue management table 120 and the erase count table 122, the controller 106 monitors the erase counts of the blocks within the spare queue 108 and the jail queue 114. The spare queue management table 118, the jail queue management table 120 and the erase count table 122 are directly refreshed by the controller 106. The spare queue management table 118, the jail queue management table 120 and the erase count table 122 may be copied to the system blocks 110 of the FLASH memory 104 in a regular time schedule or in accordance with the power-down operations, to be accessed from the FLASH memory 104 during the next power-on event.

Referring to FIG. 1, the data storage device 102 may be coupled to a host 124 and controlled by the host 124. A data storage device of the disclosure may be implemented as a memory card, a USB flash device, a solid-state drive (SSD), and so on. In another application with a multi-chip package technique, a NAND FLASH chip and a controller chip are combined in one package as an embedded MultiMediaCard (eMMC). An eMMC may be equipped onto a portable electronic device, such as a smartphone, as a storage medium.

In a smartphone, the FLASH memory 104 may be written with a large amount of data and most of the blocks may be allocated as data blocks 112, leaving just a few blocks waiting for a new allocation. When the user of a smartphone randomly turns off the phone screen when visiting web sites and repeats this behavior at his pleasure, the limited spare blocks may be frequently rewritten for browsing websites and recording the power off/on system information, and so on (corresponding to the power-cycle routines). Thus, it may result in high erase counts in some blocks. Fortunately, the techniques of the disclosure effectively reduce the burst of erase counts. The blocks verging on collapse are correctly imprisoned in the jail queue 114. The lifetime of the FLASH memory 104 is significantly extended.

Figure 2:
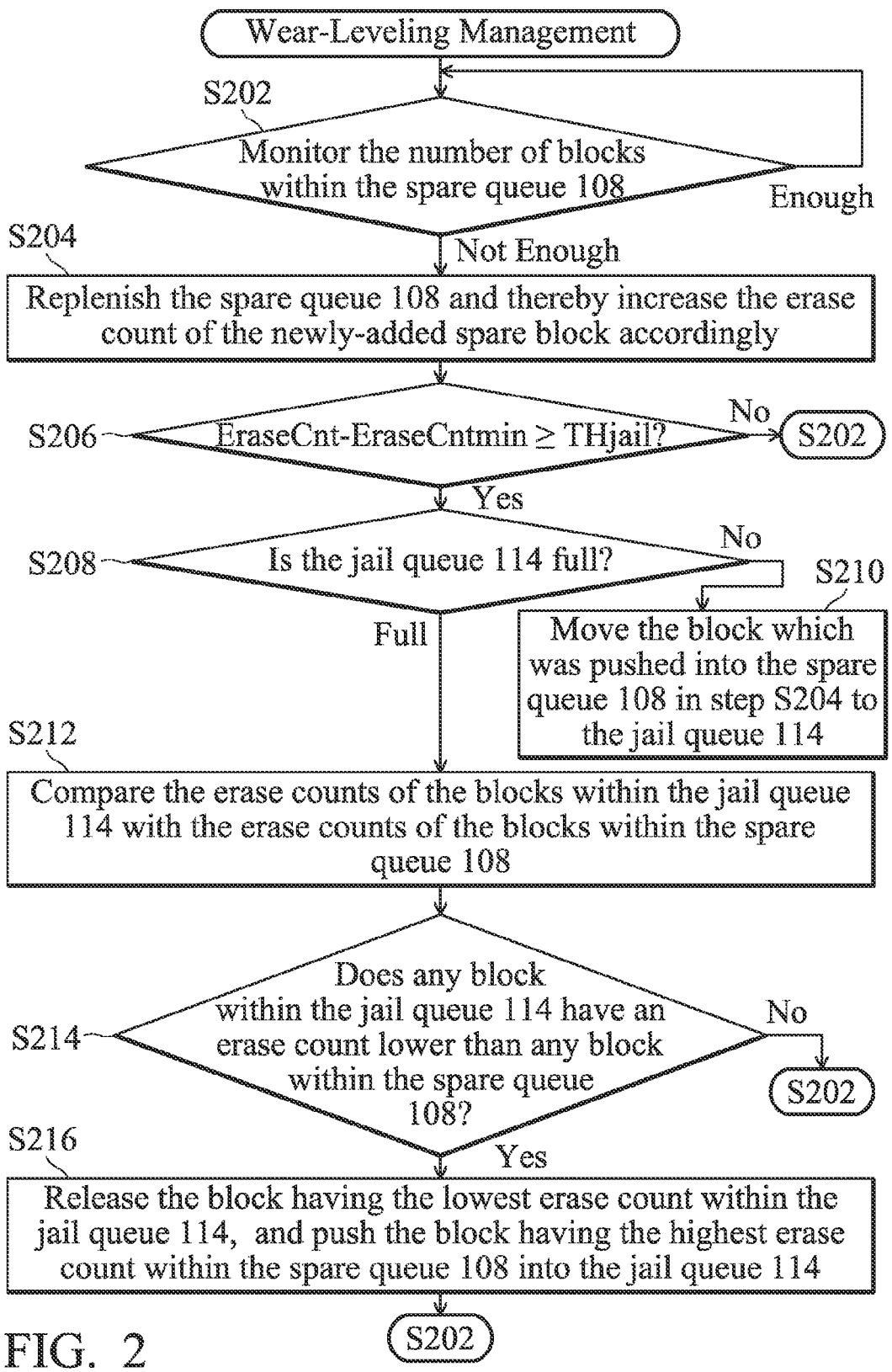
FIG. 2 is a flowchart depicting wear-leveling management for a FLASH memory in accordance with an exemplary embodiment of the invention.

FIG. 2 is a flowchart depicting wear-leveling management for a FLASH memory in accordance with an exemplary embodiment of the invention. The wear-leveling management is executed by the controller 106 and is discussed in the following with respect to FIG. 1.

In step S202, the number of blocks within the spare queue 108 is monitored. When the number of blocks within the spare queue 108 is not enough, e.g. lower than a threshold amount, step S204 is performed to replenish the spare queue 108 (e.g., pushing one of the free blocks 126 into the spare queue 108) and thereby increasing the erase count of the newly-added spare block accordingly (e.g., performing a calculation, EraseCnt++, where EraseCnt is the erase count of the newly-added spare block). In step S206, it is determined whether the erase count EraseCnt of the newly-added spare block is greater than the minimum erase count (named EraseCntmin) of all blocks within the FLASH memory 104 by a threshold THjail. When EraseCnt−EraseCntmin<THjail, the procedure returns to step S202 to keep on monitoring the number of blocks within the spare queue 108. When EraseCnt−EraseCntmin≥THjail, step S208 is performed to determine whether the jail queue 114 is full (wherein the capacity of the jail queue 114 may be set before the card opening process of the FLASH memory 104). When the jail queue 114 is not full yet, step S210 is performed, moving the block which was pushed into the spare queue 108 in step S204 to the jail queue 114. When it is determined in step S208 that the jail queue 114 is full, step S212 is performed and the erase counts of the blocks within the jail queue 114 are compared to the erase counts of the blocks within the spare queue 108. In step S214, it is determined whether any block within the jail queue 114 has an erase count lower than any block within the spare queue 108. When the blocks more verging on collapse are correctly imprisoned in the jail queue 114, the procedure returns to step S202 to keep on monitoring the number of blocks within the spare queue 108. When any block within the spare queue 108 has an erase count greater than any block within the jail queue 114, step S216 is performed. In step S216, the block having the lowest erase count within the jail queue 114 is released from the jail queue 114 and the block having the highest erase count within the spare queue 108 is pushed into the jail queue 114 and thereby is frozen. In this manner, the blocks having erase counts verging on the criterion are correctly imprisoned in the jail queue 114 and are protected from being pushed into the spare queue 108 for more erase and allocation operations.

In some exemplary embodiments, the controller 106 may include a computing unit and a read-only memory (ROM). The technical steps of the disclosure may be implemented by firmware with program coding. The related program codes are loaded in the read-only memory to be executed by the computing unit. Any control technique for a FLASH memory involving the technical concepts of the disclosure is also in the scope of the invention. FLASH memory control methods are also introduced in the disclosure and may be performed by any controller architecture.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
   a FLASH memory, providing a physical storage space comprising a plurality of blocks;
   a controller, for management of the plurality of blocks as well as a spare queue and a jail queue for the plurality of blocks of the FLASH memory, and imprisoning some of the plurality of blocks into the jail queue, wherein:
the controller further monitors erase counts of the blocks within the jail queue and the spare queue; and
when the jail queue is full and any block within the spare queue has an erase count greater than any block within the jail queue, the controller releases a first block from the jail queue and pushes a second block selected from the spare queue into the jail queue.

2. The data storage device as claimed in claim 1, wherein the first block has the lowest erase count within the jail queue.

3. The data storage device as claimed in claim 1, wherein the second block has the highest erase count within the spare queue.

4. The data storage device as claimed in claim 1, wherein the first block has the second-lowest erase count within the jail queue.

5. The data storage device as claimed in claim 1, wherein the second block has the second-highest erase count within the spare queue.

6. The data storage device as claimed in claim 1, wherein:
when the number of blocks within the spare queue is not enough, the controller replenishes the spare queue and, accordingly, increases the erase count of the block newly pushed into the spare queue.

7. The data storage device as claimed in claim 6, wherein:
when having an erase count greater than a minimum erase count of all blocks of the FLASH memory by at least a threshold while the jail queue is not full yet, the block newly pushed into the spare queue is moved to the jail queue by the controller.

8. The data storage device as claimed in claim 1, further comprising:
a random access memory, controlled by a controller for real-time update of a spare queue management table, a jail queue management table and a erase count table, wherein:
the blocks contained in the spare queue are listed in the spare queue management table;
the blocks contained in the jail queue are listed in the jail queue management table; and
the erase counts of the plurality of blocks of the FLASH memory are listed in the erase count table.

9. The data storage device as claimed in claim 8, wherein:
the controller further copies the spare queue management table, the jail queue management table and the erase count table to the system blocks of the FLASH memory to be read out in the next power-on event.

10. A FLASH memory control method, comprising:
managing a plurality of blocks of a FLASH memory as well as a spare queue and a jail queue for the plurality of blocks of the FLASH memory, and monitoring erase counts of the blocks within the jail queue and the spare queue; and
releasing a first block from the jail queue and pushing a second block selected from the spare queue into the jail queue when the jail queue is full and any block within the spare queue has an erase count greater than any block within the jail queue.

11. The FLASH memory control method as claimed in claim 10, wherein the first block has the lowest erase count within the jail queue.

12. The FLASH memory control method as claimed in claim 10, wherein the second block has the highest erase count within the spare queue.

13. The FLASH memory control method as claimed in claim 10, wherein the first block has the second-lowest erase count within the jail queue.

14. The FLASH memory control method as claimed in claim 10, wherein the second block has the second-highest erase count within the spare queue.

15. The FLASH memory control method as claimed in claim 10, further comprising:
replenishing the spare queue and increasing the erase count of the block newly pushed into the spare queue when the number of blocks within the spare queue is not enough.

16. The FLASH memory control method as claimed in claim 15, wherein:
when having an erase count greater than a minimum erase count of all blocks of the FLASH memory by at least a threshold while the jail queue is not full yet, the block newly pushed into the spare queue is moved to the jail queue.

17. The FLASH memory control method as claimed in claim 10, further comprising:
providing a random access memory for real-time update of a spare queue management table, a jail queue management table and a erase count table, wherein:
the blocks contained in the spare queue are listed in the spare queue management table;
the blocks contained in the jail queue are listed in the jail queue management table; and
the erase counts of the plurality of blocks of the FLASH memory are listed in the erase count table.

18. The FLASH memory control method as claimed in claim 17, further comprising:
copying the spare queue management table, the jail queue management table and the erase count table onto the system blocks of the FLASH memory to be read out in the next power-on event.

* * * * *